(12) United States Patent
Spicer et al.

(10) Patent No.: US 8,812,736 B2
(45) Date of Patent: Aug. 19, 2014

(54) LIMITED-BANDWIDTH ELECTRONIC DATA COMMUNICATION SYSTEM FIELD OF THE INVENTION

(75) Inventors: Steven Spicer, Kitchener (CA); Christopher Martin, Kitchener (CA); Patrick Pidduck, Waterloo (CA); Tim Lehan, Kitchener (CA); Kathy Pereira, Waterloo (CA)

(73) Assignee: Printeron Inc., Kitchener (CA)

( * ) Notice: Subject to any disclaimer, the term of this patent is extended or adjusted under 35 U.S.C. 154(b) by 0 days.

(21) Appl. No.: 13/020,322

(22) Filed: Feb. 3, 2011

(65) Prior Publication Data

US 2011/0138076 A1     Jun. 9, 2011

Related U.S. Application Data

(63) Continuation of application No. 09/926,474, filed as application No. PCT/CA01/00303 on Mar. 13, 2001, now Pat. No. 7,904,594.

(30) Foreign Application Priority Data

Mar. 13, 2000    (CA) ................................... 2301996

(51) Int. Cl.
     *G06F 15/16*      (2006.01)
(52) U.S. Cl.
     USPC ........................................ 709/246; 709/247
(58) Field of Classification Search
None
See application file for complete search history.

(56) References Cited

U.S. PATENT DOCUMENTS 5,220,674 A    6/1993    Morgan et al.
5,580,177 A   12/1996   Gase et al.
(Continued)

FOREIGN PATENT DOCUMENTS

CA    2401738 A1    9/2001
EP    1170920    1/2002
(Continued)

OTHER PUBLICATIONS

Liljeberg M. et al., "Enhanced Services for World-Wide Web in Mobile WAN Environment", Apr. 1, 1996, University of Helsinki, Department of Computer Science, Publication No. C-1996-28, Helsinki, Finland, XP002162553.

(Continued)

*Primary Examiner* — John B. Walsh
(74) *Attorney, Agent, or Firm* — Grant Tisdall; Gowling Lafleur Henderson LLP

(57) ABSTRACT

A limited-bandwidth network electronic data communication server includes an electronic data transmission server and a network terminal in communication with the electronic data transmission server over a communications network. The electronic data transmission server includes a data receiver for receiving a request for transmission of an e-mail attachment to a network terminal over a communications network. The e-mail attachment includes content and data defining the presentation of the content. A data processing system is in communication with the data receiver for converting the e-mail attachment into a less memory-intensive data format. The data processing system is configured to perform the conversion by extracting the content from the e-mail attachment without the presentation data. A data transmitter is in communication with the data processing system for transmitting the extracted content to the network terminal over the communications network without the presentation data.

15 Claims, 5 Drawing Sheets

(56) References Cited

U.S. PATENT DOCUMENTS

| | | | |
|---|---|---|---|
| 5,696,898 A | 12/1997 | Baker et al. | |
| 5,727,159 A * | 3/1998 | Kikinis | 709/246 |
| 5,764,235 A | 6/1998 | Hunt et al. | |
| 5,825,759 A | 10/1998 | Liu | |
| 5,826,062 A * | 10/1998 | Fake et al. | 715/207 |
| 5,872,926 A | 2/1999 | Levac et al. | |
| 5,903,723 A | 5/1999 | Beck et al. | |
| 5,958,006 A * | 9/1999 | Eggleston et al. | 709/219 |
| 5,987,611 A | 11/1999 | Freund | |
| 6,049,711 A | 4/2000 | Ben-Yehezkel et al. | |
| 6,064,656 A | 5/2000 | Angal et al. | |
| 6,085,227 A | 7/2000 | Edlund et al. | |
| 6,088,451 A | 7/2000 | He et al. | |
| 6,092,114 A * | 7/2000 | Shaffer et al. | 709/232 |
| 6,128,644 A | 10/2000 | Nozaki | |
| 6,138,162 A | 10/2000 | Pistriotto et al. | |
| 6,148,336 A | 11/2000 | Thomas et al. | |
| 6,151,624 A | 11/2000 | Teare et al. | |
| 6,161,139 A | 12/2000 | Win et al. | |
| 6,178,505 B1 | 1/2001 | Schneider et al. | |
| 6,182,142 B1 | 1/2001 | Win et al. | |
| 6,202,156 B1 | 3/2001 | Kalajan | |
| 6,212,565 B1 | 4/2001 | Gupta | |
| 6,219,786 B1 | 4/2001 | Cunningham et al. | |
| 6,226,752 B1 | 5/2001 | Gupta et al. | |
| 6,233,618 B1 | 5/2001 | Shannon | |
| 6,308,273 B1 | 10/2001 | Goertzel et al. | |
| 6,317,838 B1 | 11/2001 | Baize | |
| 6,324,648 B1 | 11/2001 | Grantges, Jr. | |
| 6,336,124 B1 * | 1/2002 | Alam et al. | 715/205 |
| 6,345,288 B1 | 2/2002 | Reed et al. | |
| 6,345,300 B1 | 2/2002 | Bakshi et al. | |
| 6,349,336 B1 | 2/2002 | Sit et al. | |
| 6,360,252 B1 | 3/2002 | Rudy et al. | |
| 6,377,994 B1 | 4/2002 | Ault et al. | |
| 6,408,336 B1 | 6/2002 | Schneider et al. | |
| 6,438,585 B2 | 8/2002 | Mousseau et al. | |
| 6,442,541 B1 | 8/2002 | Clark et al. | |
| 6,445,824 B2 * | 9/2002 | Hieda | 382/232 |
| 6,453,353 B1 | 9/2002 | Win et al. | |
| 6,457,030 B1 | 9/2002 | Adams et al. | |
| 6,463,474 B1 | 10/2002 | Fuh et al. | |
| 6,490,624 B1 | 12/2002 | Sampson et al. | |
| 6,510,464 B1 | 1/2003 | Grantges et al. | |
| 6,513,061 B1 | 1/2003 | Ebata et al. | |
| 6,542,892 B1 | 4/2003 | Cantwell | |
| 6,549,949 B1 | 4/2003 | Bowman-Amuah | |
| 6,553,422 B1 | 4/2003 | Nelson | |
| 6,581,092 B1 | 6/2003 | Motoyama et al. | |
| 6,598,076 B1 * | 7/2003 | Chang et al. | 709/206 |
| 6,601,108 B1 | 7/2003 | Marmor | |
| 6,604,143 B1 | 8/2003 | Nagar et al. | |
| 6,606,660 B1 | 8/2003 | Bowman-Amuah | |
| 6,606,708 B1 | 8/2003 | Devine et al. | |
| 6,615,234 B1 | 9/2003 | Adamske et al. | |
| 6,662,228 B1 | 12/2003 | Limsico | |
| 6,681,392 B1 | 1/2004 | Henry et al. | |
| 6,687,732 B1 | 2/2004 | Bector et al. | |
| 6,690,481 B1 | 2/2004 | Yeung et al. | |
| 6,704,798 B1 | 3/2004 | Mogul | |
| 6,708,220 B1 | 3/2004 | Olin | |
| 6,718,328 B1 | 4/2004 | Norris | |
| 6,728,787 B1 | 4/2004 | Leigh | |
| 6,742,039 B1 | 5/2004 | Remer et al. | |
| 6,771,595 B1 | 8/2004 | Gilbert et al. | |
| 6,785,728 B1 | 8/2004 | Schneider et al. | |
| 6,829,646 B1 * | 12/2004 | Philyaw et al. | 709/228 |
| 6,885,860 B2 | 4/2005 | Bahl et al. | |
| 6,925,595 B1 * | 8/2005 | Whitledge et al. | 715/234 |
| 6,978,299 B1 | 12/2005 | Lodwick | |
| 6,981,045 B1 | 12/2005 | Brooks | |
| 7,037,198 B2 | 5/2006 | Hameen-Anttila | |
| 7,249,188 B2 * | 7/2007 | Spicer et al. | 709/229 |
| 7,904,594 B2 * | 3/2011 | Spicer et al. | 709/246 |
| 8,493,591 B2 | 7/2013 | Kitagata | |
| 2001/0044829 A1 * | 11/2001 | Lundberg | 709/206 |
| 2002/0016818 A1 * | 2/2002 | Kirani et al. | 709/203 |
| 2002/0066026 A1 | 5/2002 | Yau et al. | |
| 2002/0122201 A1 | 9/2002 | Haraguchi et al. | |
| 2002/0143773 A1 | 10/2002 | Spicer et al. | |
| 2002/0155843 A1 | 10/2002 | Bahl et al. | |
| 2003/0037126 A1 | 2/2003 | Spicer et al. | |
| 2003/0051038 A1 | 3/2003 | Spicer et al. | |
| 2003/0078965 A1 | 4/2003 | Cocotis et al. | |
| 2003/0079030 A1 | 4/2003 | Cocotis et al. | |
| 2003/0090694 A1 | 5/2003 | Kennedy et al. | |
| 2003/0103226 A1 | 6/2003 | Nishio | |
| 2003/0191676 A1 | 10/2003 | Templeton | |
| 2003/0197887 A1 | 10/2003 | Shenoy et al. | |
| 2004/0125401 A1 | 7/2004 | Earl et al. | |
| 2004/0190049 A1 | 9/2004 | Itoh | |
| 2004/0252337 A1 | 12/2004 | Takabayashi et al. | |
| 2005/0085241 A1 | 4/2005 | Bahl et al. | |
| 2005/0255861 A1 | 11/2005 | Wilson et al. | |
| 2006/0168258 A1 | 7/2006 | Spicer et al. | |
| 2007/0234354 A1 | 10/2007 | Hattori | |
| 2008/0184162 A1 | 7/2008 | Lindsey et al. | |
| 2008/0193182 A1 | 8/2008 | Sasama | |
| 2008/0246988 A1 | 10/2008 | Ashton | |
| 2010/0094979 A1 | 4/2010 | Azami | |
| 2010/0095367 A1 | 4/2010 | Narayanaswamy | |
| 2010/0103453 A1 | 4/2010 | Tsutsumi | |

FOREIGN PATENT DOCUMENTS

| | | |
|---|---|---|
| EP | 1271302 A2 | 1/2003 |
| EP | 1435565 | 7/2004 |
| EP | 1460529 | 9/2004 |
| WO | 9836344 | 8/1998 |
| WO | 9840992 | 9/1998 |
| WO | 9922294 | 5/1999 |
| WO | 9965256 | 12/1999 |
| WO | 0011850 | 3/2000 |
| WO | 0122259 | 3/2001 |
| WO | 03019403 A2 | 3/2003 |

OTHER PUBLICATIONS

Zenel B. et al., "Intelligent Communication Filtering for Limited Bandwidth Environments", Workshop on Hot Topics in Operating Systems, May 4, 1995, pp. 28-34, XP002094011, p. 28, line 12—p. 34, line 11.

Australian Examination Report dated May 25, 2005 issued from the Australian Patent Office relating to Australian Patent Application No. 2001243980.

Canadian Office Action dated Aug. 7, 2012 issued from the Canadian Intellectual Property Office relating to Canadian Patent Application No. 2,301,996.

Canadian Office Action dated Jan. 5, 2011 issued from the Canadian Intellectual Property Office relating to Canadian Patent Application No. 2,301,996.

Canadian Office Action dated Jul. 16, 2008 issued from the Canadian Intellectual Property Office relating to Canadian Patent Application No. 2,301,996.

Sitao W. et al.: "Using Device Driver Software in Scada Systems" 2000 IEEE Power Engineering Society. Winter Meeting Conference Proceedings. Singapore, Ja 23-27, 2000, IEEE Power Engineering Society Winder Meeting, New York, NY: right-hand column, paragraph 3, p. 2047, right-hand column, paragraph 1.

Qi Lu et al., "Efficient large-scale access control for Internet/intranet information systems", System Sciences, Proceedings of the 32nd Annual Hawaii International Conference on Volume, Jan. 5-8, 1999, pp. 9.

Hiltunen et al., "Access control in wide-area networks", Distributed Computing Systems, Proceedings of the 17th International Conference, May 27-30, 1997 pp. 330-337.

Johnston et al., "Authorization and attribute certificates for widely distributed access control", Enabling Technologies: Infrastructure for Collaborative Enterprises, Proceedings, Seventh IEEE International Workshops, Jun. 17-19, 1998, pp. 340-345.

(56) References Cited

OTHER PUBLICATIONS

Kumar et al., "Security management architecture for access control to network resources", Computers and Digital Techniques, IEE Proceedings—vol. 144, Issue 6, Nov. 1997, pp. 362-370.

International Search Report, PCT Application No. PCT/CA2011/000991 dated Dec. 19, 2011.

International Search Report, PCT Application No. PCT/CA2011/000994 dated Dec. 1, 2011.

Extended European Search Report dated Jan. 23, 2014 relating to European Patent Application No. 11824384.9.

Canadian Office Action dated Jul. 30, 2009 issued from the Canadian Intellectual Property Office relating to Canadian Patent Application No. 2,401,738.

Canadian Office Action dated Nov. 27, 2007 issued from the Canadian Intellectual Property Office relating to Canadian Patent Application No. 2,401,738.

Canadian Office Action dated Apr. 28, 2009 issued from the Canadian Intellectual Property Office relating to Canadian Patent Application No. 2,401,717.

Canadian Office Action dated Sep. 21, 2007 issued from the Canadian Intellectual Property Office relating to Canadian Patent Application No. 2,401,717.

Canadian Office Action dated Apr. 24, 2007 issued from the Canadian Intellectual Property Office relating to Canadian Patent Application No. 2,401,729.

Canadian Office Action dated Aug. 13, 2009 issued from the Canadian Intellectual Property Office relating to Canadian Patent Application No. 2,401,721.

Canadian Office Action dated Nov. 21, 2007 issued from the Canadian Intellectual Property Office relating to Canadian Patent Application No. 2,401,721.

Extended European Search Report dated May 13, 2011 relating to European Patent Application No. 10011973.4.

European Examination Report dated Feb. 26, 2013 relating to European Patent Application No. 10011973.4.

International Search Report, PCT Application No. PCT/CA2011/000992 dated.

International Search Report, PCT Application No. PCT/CA2011/000993 dated.

International Search Report, PCT Application No. PCT/CA2011/000995.

International Search Report, PCT Application No. PCT/CA2011/001295.

Extended European Search Report dated Feb. 4, 2014 issued from the European Patent Office relating to European Patent Application No. 11824385.6.

Extended European Search Report dated Feb. 5, 2014 issued from the European Patent Office relating to European Patent Application No. 11824383.1.

\* cited by examiner

LIMITED-BANDWIDTH ELECTRONIC DATA COMMUNICATION SYSTEM FIELD OF THE INVENTION (This application is a continuation of U.S. patent application Ser. No. 09/926,474, filed Jan. 18, 2002 in its entirety herein incorporated by reference, which claims the benefit of PCT Application No. PCT/CA01/00303, filed Mar. 13, 2001 in its entirety herein incorporated by reference, which claims the benefit of Canadian Patent Application No. 2,301.996, filed Mar. 13, 2000 in its entirety herein incorporated by reference.)

FIELD OF THE INVENTION

The present invention relates to a method and system for data communication over a network. In particular, the present invention relates to a method and system for transmitting electronic messages over a limited bandwidth network, such as a wireless network.

BACKGROUND OF THE INVENTION

Wireless communications devices, such as e-mail pagers, wireless telephones and personal data assistants, have become increasingly popular due to their ability to provide users with electronic messaging capabilities outside the confines of the office workplace. To enhance the portability and battery life of such devices, the typical wireless communications device includes a low powered microprocessor, limited memory resources, and a low resolution display. However, notwithstanding the popularity of these devices, the conventional wireless communications device is deficient in a number of respects.

First, given the limited computational capabilities of these devices, it is often difficult to receive and process messages having dense or complex informational content, such as messages which include images, sound effects and/or complex textual formatting.

This problem is compounded by limitations in wireless bandwidth.

Second, often an originator of an e-mail message will attach a non-MIME-based document to the MIME-based section of the message. For example, the originator of the e-mail message might attach a document created with word processor software, spreadsheet software or graphics presentation software. Given that each document type can have any of variety of different file formats, it often difficult, if not impossible, to view the content of document attachments on the conventional wireless communications device given the limited computational capabilities of these devices.

Third, the computational and display resolution capabilities of these devices can vary considerably from manufacturer to manufacturer. Consequently, an electronic message configured for reception and review on one wireless communications device may not be accurately displayed on another wireless communications device.

Fourth, users of wireless communications devices typically must pay their respective wireless service provider for the wireless service in accordance with the volume of data received with their device. Since the user of the wireless communications device cannot preview the electronic message prior to receipt on their device, the cost associated with the ownership of these devices can be prohibitive.

Therefore, there remains a need for an electronic data communication system for message transmission to wireless communications devices which recognizes the computational power and bandwidth limitations associated with these devices, the varied computational and display capabilities of these devices, the variety of available electronic message formats, and the costs associated with ownership and operation of these devices.

SUMMARY OF THE INVENTION

According to a first aspect of the present invention, there is provided an electronic transmission system and a method of electronic data transmission which addresses at least one deficiency of the conventional electronic message communication system.

According to a second aspect of the present invention, there is provided an electronic data terminal and a method of electronic data transmission which addresses which addresses at least one deficiency of the conventional electronic message transmission system.

The electronic data transmission system, according to the first aspect of the present invention, includes a data receiver, a data formatter and a data transmitter. The data receiver is configured to receive a request for transmission of electronic data to a network terminal over a communications network, with the transmission request including at least one data filtration parameter defining a desired resolution of the electronic data. The data formatter is in communication with the data receiver for formatting the electronic data in accordance with the data filtration parameter. The data transmitter is in communication with the data formatter for transmitting the formatted data to the network terminal over the communications network.

The method of electronic data transmission, according to the first aspect of the present invention, includes the steps of (1) receiving a request for transmission of electronic data over a communications network to a network terminal, the transmission request including at least one data filtration parameter defining a desired resolution of the electronic data; (2) formatting the electronic data in accordance with the data filtration parameter; and (3) transmitting the formatted data to the network terminal over the communications network.

The electronic data terminal, according to the second aspect of the present invention, includes a data receiver, a data reformatter and a data transmitter. The data receiver is configured to receive over a communications network a data package from a data server. The data reformatter is in communication with the data receiver for extracting electronic data from the data package. The data transmitter is in communication with the data formatter for providing the data server with a request for retransmission of the electronic data, with the retransmission request including at least one data filtration parameter defining a desired resolution for the retransmitted electronic data.

The method of electronic data transmission, according to the second aspect of the present invention, includes the steps of (1) receiving over a communications network a data package from a data server; (2) extracting electronic data from the data package; and (3) in accordance with a resolution of the extracted electronic data providing the data server with a request for retransmission of the electronic data, the retransmission request including at least one data filtration parameter defining a desired resolution for the retransmitted electronic data.

In accordance with one implementation of the invention, using the data transmitter an operator of an electronic data terminal transmits a request for transmission of an electronic message from the electronic data transmission system to the electronic data terminal. Upon receipt of the transmission request, the data formatter of the electronic data transmission system formats the electronic message in accordance with a default filtration parameter associated with the electronic data terminal, and assembles the electronic message as part of an electronic data package. Alternately, the retransmission request may include at least one data filtration parameter defining a desired alternate resolution for the electronic message, in which case the data formatter of the electronic data transmission system formats the electronic message in accordance with the specified filtration parameter. Typical filtration parameters may require replacement of particular words with recognized abbreviations, removal of font and attribute data, replacement of formatting data with format tags to reduce a byte length of the electronic data, and/or removal of graphics data from the electronic data.

When the formatting step is completed, the data transmitter of the electronic data transmission system transmits the electronic data package to the electronic data terminal. Upon receipt of the electronic data package, the data reformatter of the electronic data terminal extracts the electronic message from the data package for review by the operator of the electronic data terminal. If the operator of the electronic data terminal concludes that the resolution of the extracted electronic message is unsatisfactory, the operator can transmit a request to the electronic data transmission system for retransmission of the electronic message. The retransmission request includes at least one data filtration parameter defining the desired alternate resolution for the electronic message.

Alternately, if the operator desires that the electronic message be transmitted to a network resource, such as a network printer, the operator transmits a request to the electronic data transmitter for retransmission of the electronic message. Upon receipt of the retransmission request, the electronic data transmission system queries a central resource registry to identify a user access level for the specified network resource, and then determines from the access level defined for the network resource whether the electronic data terminal is authorized for communication with the specified network resource. The electronic data transmission system then transmits the original unfiltered electronic message to the network resource in accordance with the determined authorization.

BRIEF DESCRIPTION OF THE DRAWINGS

The present invention will now be described, by way of example only, with reference to the drawings, in which.

DETAILED DESCRIPTION OF THE PREFERRED EMBODIMENT

Figure 1:
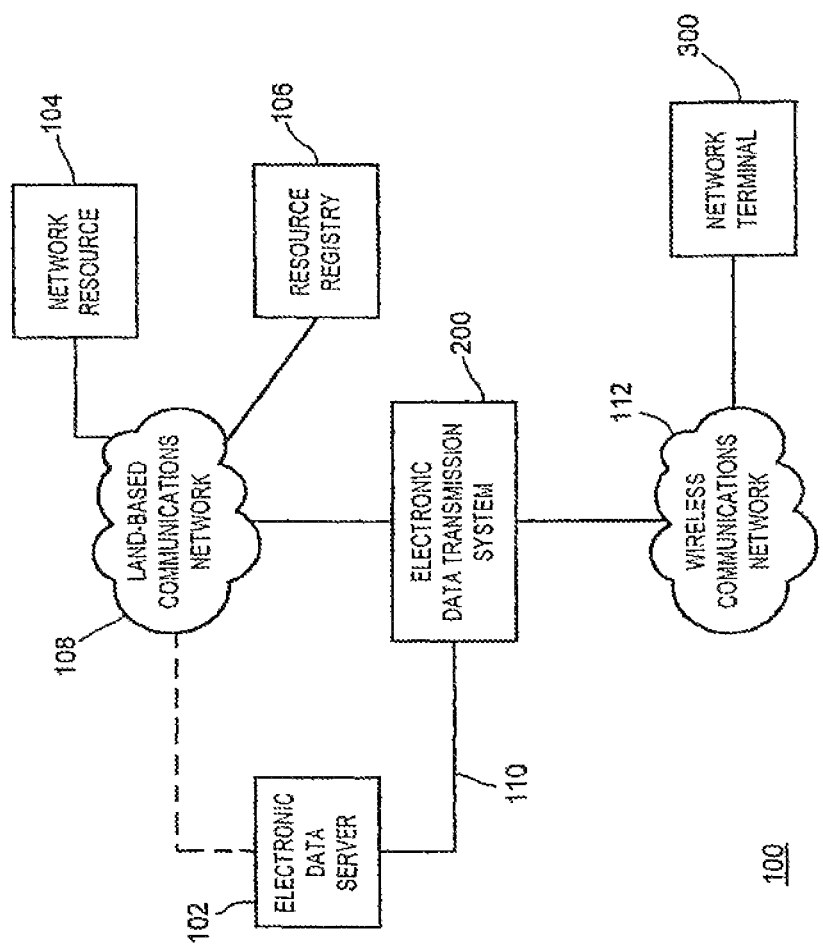
FIG. 1 is a schematic view of a limited-bandwidth electronic data communication system, showing the electronic data transmission system and the network terminals according to the present invention.

Turning to FIG. 1, a limited-bandwidth electronic data communication system, denoted generally as 100, is shown comprising an electronic data server 102, a network resource 104, a resource registry 106, an electronic data transmission system 200 in communication with the electronic data server 102, and a network terminal 300. Typically, the electronic data communication system 100 includes a plurality of the electronic data servers 102, a plurality of the network resources 106, a plurality of the electronic data transmission systems 200, and a plurality of the network terminals 300, however for enhanced clarity of discussion, FIG. 1 only shows a single electronic data server 102, a single network resource 104, a single electronic data transmission system 200, and a single network terminal 300. Further, any of the network resources 104 and the network terminals 300 may comprise either land-based communications devices or wireless communications devices.

The electronic data communication system 100 also includes a land-based communications network 108 for facilitating communication between the electronic data server 102, land-based versions of the network resources 104, the resource registry 106, the electronic data transmission system 200, and land-based versions of the network terminals 300. Preferably, the electronic data server 102 is accessible to the electronic data transmission system 200 over a secure communication channel 110 established between the electronic data server 102 and the electronic data transmission system 200, however the electronic data server 102 may also be accessible to the electronic data transmission system 200 over the land-based communications network 108. In addition to the land-based communications network 108, preferably the electronic data communication system 100 includes a wireless communications network 112 for facilitating communication between wireless versions of the network resources 104, the electronic data transmission system 200, and wireless versions of the network terminals 300. However, it should be understood that the electronic data communication system 100 is not limited to the foregoing network configuration, but instead may comprise a single land-based network or a single wireless network, as the requirements of the network resources 104 and the network terminals 300 dictate.

Preferably, the land-based communications network 108 comprises the Internet, and the electronic data servers 102 comprise land-based network-enabled POP3 e-mail servers for receiving and storing electronic mail messages received from remote SMTP e-mail servers over the Internet. However, the electronic data servers 102 need not be e-mail servers, but instead may comprise any computer server which is configured to transmit electronic data to one of the electronic data transmission systems 200. For instance, any of the electronic data servers 102 may comprise a music file server, an image file server, a multimedia file server, a File Transfer Protocol (FTP) server, or even a Hyper-Text Markup Language (HTML) World Wide Web server.

Typically, each network resource 104 comprises a printing device, and in particular, an IPP-compliant printer. However, the network resources 104 need not only be networked printers (IPP-compliant or otherwise), but instead may comprise any of a variety of data communication devices, including facsimile machines, image servers and file servers. Further, as discussed above, the electronic data communication system 100 is not limited for use with land-based data communications devices, but instead can be used to provide access to wireless communications devices. For instance, any of the network resources 104 may comprise e-mail pagers or e-mail enabled wireless telephones. Typically, the network resources 104 are directly accessible over the respective communications network 108,112. For instance, one of the network resources 104 may comprises an IPP-capable printer or facsimile machine. However, in one variation, at least one of the network resources 104 is not directly accessible over the respective communications network 108,112, but instead is indirectly accessible over the communications network 108, 112 via a suitable server.

The resource registry 106 comprises a computer server configured for interfacing with the communications network 108, and includes a resource database 114 and a user registration database 116. The resource database 114 includes resource records identifying parameters associated with the network resources 104. Preferably, each resource record includes a network address field, a resource type field, and a user access level field for the associated network resource 104.

The network address field identifies the network address of the network resource 104.

If the network resource 104 is directly accessible over the communications network 108, the network address field identifies the network address of the network resource 104. However, if the network resource 104 is not directly accessible over the communications network 108, but instead is linked to the communications network 108 via a suitable server, the network address field identifies the network address of the server associated with the network resource 104.

The resource type field identifies the type of data communication device of the network resource 104. For instance, the resource type field may specify that the network resource 104 is a printer, a plotter, a facsimile machine, an image server or a file server. Further, the resource type field may include a resource type sub-field specifying a sub-class of the network resource type. For example, the resource type sub-field may specify that the network resource is an IPP-capable printer or facsimile machine, or a non-IPP-capable printer or facsimile machine.

The user access level field identifies the type of communications access which the network terminals 300 are allowed to have in regards to the associated network resource 104. In the embodiment, as presently envisaged, the user access level field establishes that the network resource 104 allows one of: (public access "in which any network terminal 300 of the electronic data communication system 100 can communicate with the network resource 104; (b) "private access" in which only members (eg. employees) of the enterprise associated with the network resource 104 can communicate with the network resource 104; and (c)"authorized access" in which only particular network terminals 300 can communicate with the network resource 104.

If the user access level field specifies "authorized access" for a network resource 104, preferably the user access level field includes a sub-field which lists the network addresses of the network terminals 300 authorized to access the network resource 104, and a sub-field which includes an authorization password which the identified network terminals 300 must provide in order to access the network resource 104. If the user access level field specifies "private access" for a network resource 104, preferably the user access level field includes a sub-field which lists the network addresses of the network terminals 300 which are deemed to members of the enterprise.

It should be understood, however, that the user access level field is not limited to identifying only the foregoing pre-defined user access levels, but may instead identify more than one of the predefined user access levels, or other user access levels altogether. For instance, the user access level field may identify that the associated network resource 104 allows both private access to all employees of the enterprise responsible for operation of the network resource 104, and authorized access to other pre-identified network terminals 300. Further, the user access level field may also include one or more sub-fields which provide additional restrictions/permissions on the type of communications access which the network terminals 300 are allowed to have in regards to the associated network resource 104. For instance, the user access level sub-fields may limit the hours of operation of the network resource 104, or may place restrictions on the type of access limitations on a per-user basis, or per-group basis. Other variations on the type of access will be readily apparent, and are intended to be encompassed by the scope of the present invention.

Preferably, each resource record also includes an information field which provides additional information on the network resource 104, such as data handling capabilities, resource pricing and geographical co-ordinates. This latter parameter is particularly advantageous for use with mobile network terminals 300, such as a wireless-enabled personal data assistant or an e-mail-enabled wireless telephone, since it allows the network terminal 300 to identify the nearest one of a plurality of available network resources 104. In addition, each resource record includes a pseudo-name field, and a username/password field. The pseudo-name field contains a resource pseudo-name which identifies the network resource 104 to the network terminals 300. Preferably, the pseudo-name is a network alias that identifies the physical location and properties of the network resource 104, but does not identify the network address of the resource 104. The username/password field contains a unique username and password combination uniquely associated with the administrator of the associated network resource 104.

The user registration database 116 of the resource registry 106 includes user records each uniquely associated with an operator of a respective network terminal 300.

Preferably, each user record identifies the registered user's name, post office address and/or e-mail address, and a default filtration parameter (discussed below) for the transmission of electronic data to the operator's wireless terminal 300. In addition, each user record specifies a password uniquely associated with the operator which the operator must specify in order to receive secure electronic data from the data server 102, and to update the operator's user record and to obtain access to network resources 104 configured for "authorized access".

The resource registry 106 is configured to provide administrators of the network resources 104 with controlled access to the records of the resource database 114 to allow the administrators to update the network address field, the resource type field, the user access level field, the resource information field, the pseudo-name field, and the username/password field of the resource record for the associated network resource 104. This mechanism allows network administrators to change, for example, the network address and/or the restrictions/permissions of the network resources 104 under their control, or even the network resource 104 itself, without having to notify each network terminal 300 of the change. The resource registry 106 is also configured to provide controlled access to the records of the user registration database 116 so that only the operator of the network terminal 300 which established the user record can update the user record.

Figure 2:
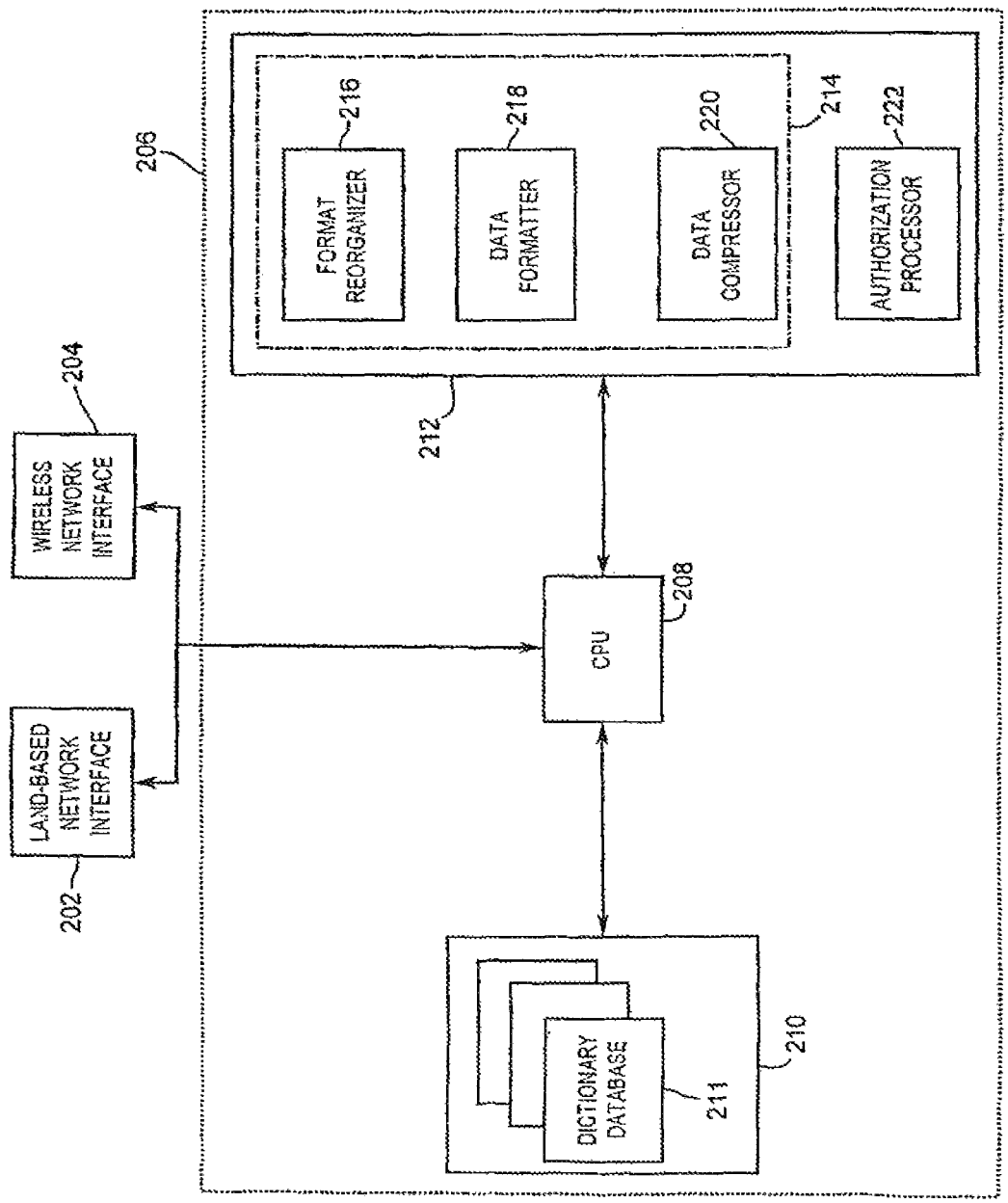
FIG. 2 is a schematic view of the electronic data transmission system depicted in FIG. 1, showing the data receiver, the data formatter and the data transmitter of the electronic data transmission system.

As shown in FIG. 2, each electronic data transmission system 200 is provided as a network-enabled computer server and comprises a land-based network interface 202 for interfacing with the land-based communications network 108, a wireless network interface 204 for interfacing with the wireless network 112, and a data processing system 206 in communication with the land-based network interface 202 and the wireless network interface 204. Typically, the land-based network interface 202 comprises an Ethernet network circuit card and the wireless network interface 204 comprises an RF antenna, however the electronic data transmitter 200 need not include both a land-based network interface 202 and a wireless network interlace 204 but instead could be limited to only a land-based network interface 202 or a wireless network interface 204 as dictated by the network configuration.

The wireless network interface 204 typically is configured as a data receiver for receiving a transmission request for transmission of electronic data over the wireless communications network 112 to one of the network terminals 300. The land-based network interface 202 typically is configured to transmit the transmission request to the data server 102 over the land-based communications network 108, and to receive the requested electronic data from the data server 102. Typically, the electronic data comprises an e-mail message having an attachment document, however the electronic data can comprise other data forms, as discussed above, such as an HTML e-mail message, an electronic sound/music file, an electronic image file or an HTML document.

The data processing system 206 includes a central processing unit (CPU) 208, and a non-volatile memory storage device (DISC) 210 (such as a magnetic disc memory or electronic memory) and a read/write memory (RAM) 212 both in communication with the CPU 208. Preferably, the DISC 210 includes a dictionary database 211 which includes a table of recognized words or phrases and associated pre-defined binary phrase tags. As will be explained, the data processing system 206 uses the dictionary database 21 to convert pre-established words and/or phrases into binary phrase tags in order to reduce the byte size of the electronic data transmitted to the network terminal 300.

The DISC 210 also includes data which, when loaded into the RAM 212, comprise processor instructions for the CPU 208. The processor instructions establish in the RAM 212 one or more memory objects defining a data format processor 214 and an authorization processor 222 in communication with the network interfaces 202,204.

Typically, the data format processor 214 comprises a format reorganizer 216, a data formatter 218, and a data compressor 220.

The format reorganizer 216 is configured to convert the received electronic data from the original format to a less memory-intensive format. For instance, if the electronic data comprises the attachment to an e-mail message, and the attachment comprises an electronic spreadsheet data file, the format reorganizer 216 would calculate the values of each cell of the spreadsheet and output the resulting numbers. Consequently the number of bytes occupied by the electronic data would be reduced since the electronic data would no longer include the spreadsheet formulae. Alternately, if the attachment comprises a raster image, such as a facsimile transmission, the format reorganizer would convert the image data to text data, thereby again reducing the number of bytes occupied by the electronic data.

The data formatter 218 is in communication with the output of the format reorganizer 216, and is configured to format the electronic data in accordance with one or more data filtration parameters. The data filtration parameters may comprise either default filtration parameters for the network terminal 300, or filtration parameters received from the network terminal 300 together with the transmission request. If the electronic data comprises a text message either attached to an e-mail message or included in the body of an e-mail message, appropriate filtration parameters include: (a) a "space parameter" for instructing the data formatter 218 to remove one or more of white space, line spacing data and tabbing data from the text of the e-mail message; (b) a "punctuation parameter" for instructing the data formatter 218 to remove punctuation from the text of the e-mail message; (c) a "font parameter" for instructing the data formatter 218 to remove from the e-mail attachment font data and/or attribute data associated with the text of the e-mail message; (d) a "graphics parameter" for instructing the data formatter 218 to remove any graphics data from the e-mail message; (e) a "formatting parameter" for instructing the data formatter 218 to replacing paragraph formatting data, such as paragraph justification data and indent data from the text of the e-mail message with pre-defined format tags; (f) a "word abbreviation parameter" for instructing the data formatter 218 to replace recognized words in the e-mail message with pre-defined word abbreviations; and (g) a "dictionary lookup parameter" for instructing the data formatter 218 to replace recognized words or phrases in the e-mail message with pre-defined phrase tags for reducing the byte length of the electronic data As will be apparent, the foregoing list of filtration parameters is not exhaustive, but may be expanded in accordance with the context of the electronic data. Preferably, the data formatter 218 is configured with a sufficient number of filtration parameters so as to offer several levels of data filtration. Further, the filtration parameters are not limited for use with e-mail attachments, but can also be used in association with the body of an e-mail message. In addition, the filtration parameters are not limited for use with electronic text data, but can be used with other forms of electronic data, such as electronic music files or electronic image files. For instance, if the data server 102 includes electronic music files, the data formatter 218 can be configured to convert stereo channel data to mono channel data, or to boost or reduce the gain of selected ranges of frequencies. If the data server 102 includes electronic image files, the data formatter 218 can be configured to reduce the resolution of the image in accordance with the graphics handling capabilities of the network terminal 300. Other forms of filtration parameters will be apparent to those of ordinary skill, and are intended to be encompassed by the present invention.

The data compressor 220 is configured to compress the formatted electronic data to further reduce the size of the data transmission to the network terminals 300.

Preferably, the data compressor 220 is configured to use a standard compression algorithm, such as LZW, to compress the data, however the data compressor 220 may also be configured to use a proprietary compression algorithm suited to the content of the electronic data.

The authorization processor 222 of the data processing system 206 is provided to determine whether the network terminal 300 is authorized to transmit data to selected network resources 104, and to facilitate the transmission of electronic data between the data server 102 and the selected network resource 104 upon command from then network terminal 300. This aspect of the invention will be explained in greater detail below.

Figure 3:
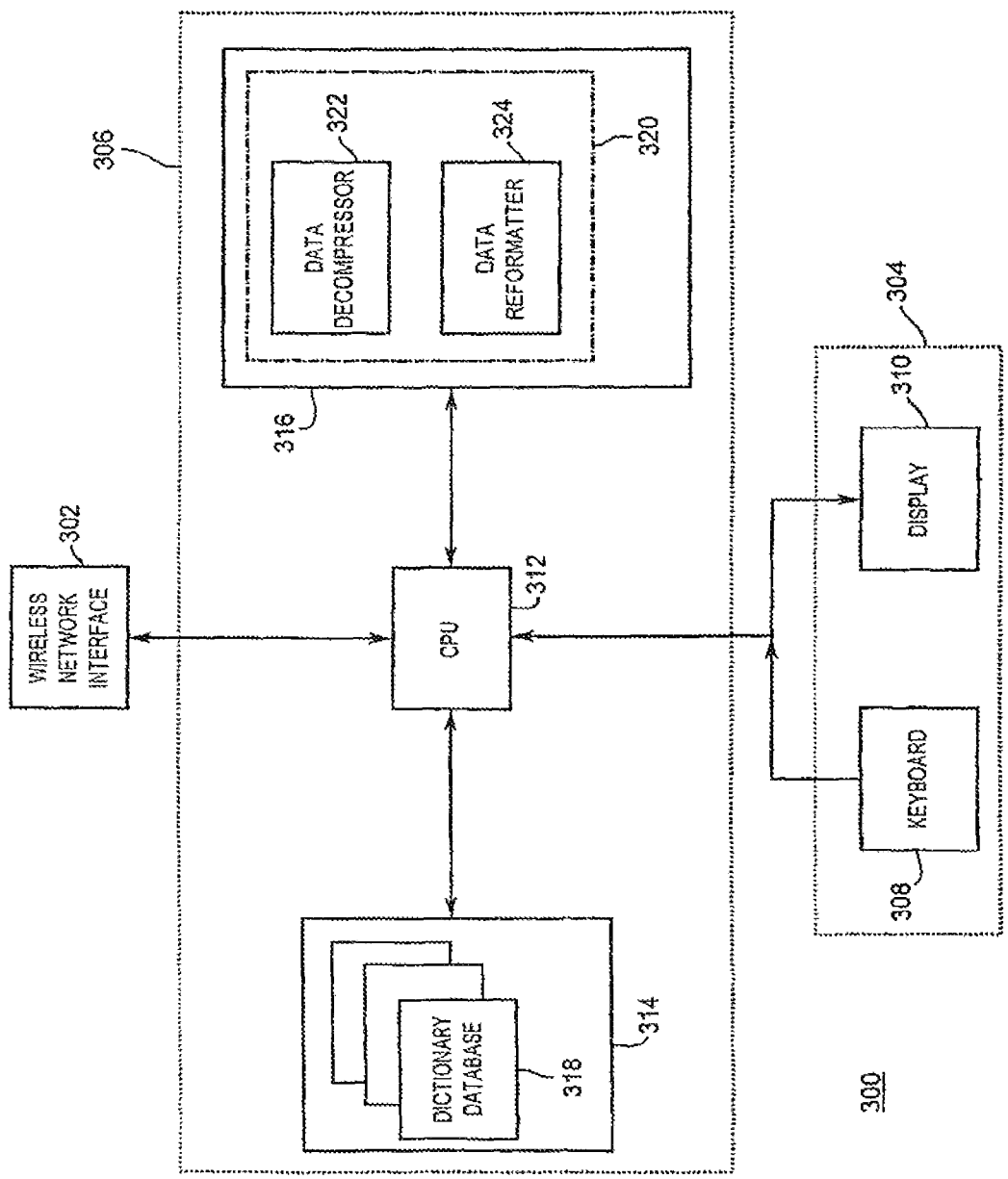
FIG. 3 is a schematic view of one of the network terminals depicted in FIG. 1, showing the data receiver, the data reformatter and the data transmitter of the data terminal.

Preferably, each network terminal 300 is provided as a network-enabled wireless communications device, such as a wireless-enabled personal data assistant or an e-mail-enabled wireless telephone. However, the network terminals 300 may instead comprise land-based network-enabled communications devices, such as portable computers, or a mixture of wireless and land-based communications devices. As shown in FIG. 3, the network terminal 300 comprises a wireless network interface 302 for interfacing the network terminal 300 with the wireless communications network 112, a user interface 304, and a data processing system 306 in communication with the network interface 302 and the wireless network interface 304. Preferably, the user interface 304 comprises a data entry device 308 (such as keyboard, microphone or writing tablet), and a display device 310 (such as a CRT or LCD display). However, as will be apparent, if the data server 102 contains music files, the user interface 308 will include a speaker instead of the display device 310.

The data processing system 306 includes a central processing unit (CPU) 312, and a non-volatile memory storage device (ROM) 314 (such as an electronic memory) and a read/write memory (RAM) 316 both in communication with the CPU 312.

Preferably, the ROM 314 includes a dictionary database 318 which includes a table of recognized words or phrases and associated pre-defined binary phrase tags. As will be explained, the data processing system 306 uses the dictionary database 318 to convert phrase tags received in electronic data transmitted to the network terminal 300 into the corresponding text.

The ROM 314 also includes data which, when loaded into the RAM 316, comprise processor instructions for the CPU 312. The processor instructions establish in the RAM 316 one or more memory objects defining a data reprocessor 320 in communication with the network interface 302, the user interface 304 and the dictionary database 318. Typically, the data reprocessor 320 comprises a data decompressor 322 and a data reformatter 324.

The wireless network interface 302 typically is configured as a data transmitter to provide the wireless communications network 112 with a request for transmission of electronic data. As discussed above, the transmission request can include one or more filtration parameters. The wireless network interface 302 is also configured as a data receiver for receiving an electronic data package from the electronic data transmission system 200 over the wireless communications network 112 in response to the transmission request. The data decompressor 322 is configured to decompress the compressed electronic data received from the electronic data transmission system 200, and to extract the decompressed formatted electronic data from the received data package. The data reformatter 324 is configured to reformat the formatted electronic data using the format tags and the pre-defined phrase tags included in the electronic data, and then to transmit the extracted electronic data to the display device 310 for review.

Figure 4:
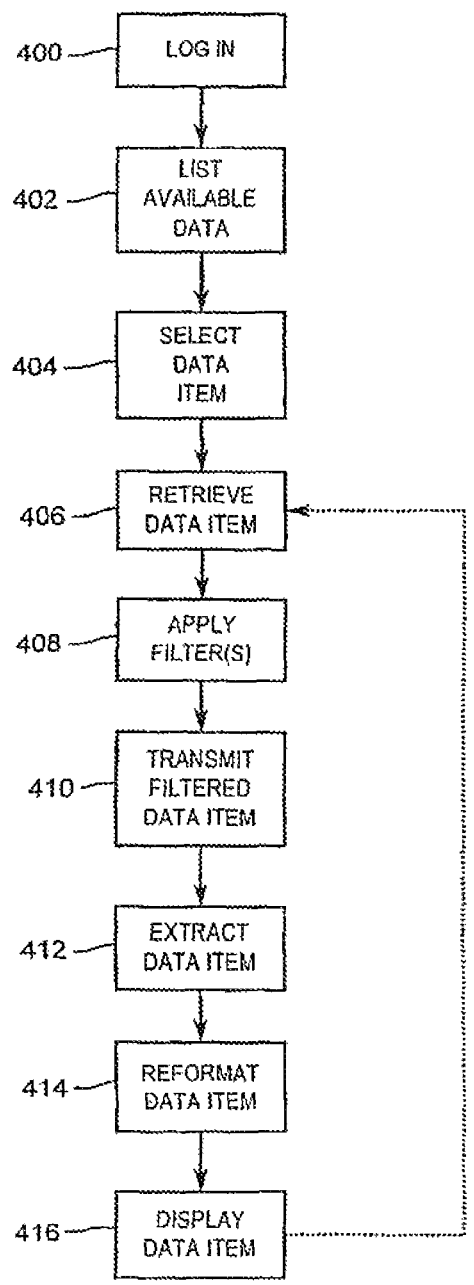
FIG. 4 is a flow chart depicting the method of transmitting electronic data between the electronic data transmission system and one of the network terminals.

The process by which an operator of a network terminal 300 receives and transmits electronic data with the network terminal 300 will now described with reference to FIG. 4. At step 400, the operator of the network terminal 300 logs in to the electronic data communication system 100 by transmitting to the electronic data transmission system 200 the operator's name and assigned password. By logging in to the electronic data communication system 100, the operator will have access to any network resources 104 which have "authorized access" as the user access level and which have identified the operator as a user authorized to access the network resource 104. However, it should be appreciated that the operator need not log in to the electronic data communication system 100, however the operator will then only have access to the network resources 104 which have established "public access" as the user access level.

At step 402, the electronic data transmission system 200 queries the user registration database 116 with the operator's username and password (if provided) to verify the identity of the operator. The electronic data transmission system 200 then queries the data server 102 for a list of all electronic data available to the operator of the network terminal 300. In the instance where the data server 102 is a POP3 e-mail server, the electronic data transmission system 200 logs in to the data server 102 by providing the data server 102 with the username and password in accordance with the POP3 authentication protocol.

If the username and password is authenticated, the data server 102 transmits to the electronic data transmission system 200 a list of all items of electronic data available to the operator of the network terminal 300. Typically, the electronic data listing will include data identifiers uniquely associated with each item of electronic data, together with a subject field identifying the subject of the associated item of electronic data.

The electronic data transmission system 200 then transmits the electronic data listing to the network terminal 300 over the wireless network 112.

Upon receipt, the data processing system 306 displays the subject fields of the electronic data listing on the display device 310. The operator of the network terminal 300 selects an item of electronic data from the electronic data listing for review using the data entry device 308 of the network terminal 300, at step 404, and then transmits the data identifier of the selected electronic data item to the electronic data transmission system 200 over the wireless network 112.

The electronic data transmission system 200 transmits the data identifier to the data server 102, at step 406, requesting transmission of the identified electronic data item.

As will be appreciated, if the data server 102 comprises a POP3 e-mail server, the electronic data transmission system 200 transmits the data identifier to the data server 102 in accordance with the POP3 authentication protocol.

Typically, the operator of the network terminal 300 initially will not specify a filtration parameter when transmitting the data identifier to the electronic data transmission system 200. Accordingly, upon receipt of the electronic data item from the data server 102, the data processing system 206 of the electronic data transmission system 200 will query the user registration database 116 with the operator's username and password to determine the default filtration parameter for the operator's wireless terminal 300. Alternately, however, the operator of the network terminal 300 may transmit a filtration parameter with the data identifier, if the default filtration is not desired.

At step 408, the format reorganizer 216 of the electronic data transmission system 200 converts the electronic data received from the data server into a less memory-intensive format. If no filtration parameter is specified, the data formatter 218 of the electronic data transmission system 200 formats the electronic data received from the format reorganizer 216 in accordance with the default filtration parameter. However, if a filtration parameter is specified, the data formatter 218 formats the electronic data in accordance with the specified filtration parameter.

The formatting parameter may instruct the data formatter 218 to perform any of a number of different formatting operations on the electronic data. As discussed above, if the data server 102 comprises an e-mail server, the parameter may instruct the data formatter 218 to perform any of a variety of different e-mail formatting operations on the e-mail message, including the following formatting operations: (a) removal of white space, line spacing data and/or tabbing data from the text of message (b) removal of punctuation from the text of the message (c) removal of font data and/or attribute data associated with the text of the message (d) removal of any graphics data from the message (e) replacement of paragraph formatting data from the text of the message with predefined format tags (f) replacement of recognized words in the message with pre-defined word abbreviations; and (g) replacement of recognized words or phrases in the message with pre-defined binary phrase tags At the end of the data formatting step, preferably the data compressor 220 compresses the formatted electronic data. The electronic data transmission system 200 then transmits the compressed formatted electronic data to the network terminal 300 over the wireless network 112, at step 410. Typically, the compressed formatted electronic data is transmitted as part of an encrypted data package which includes the network address of the network terminal 300 to provide a level of assurance that the electronic data is not accessible to operators of other network terminals 300.

Upon receipt of the data package, the data decompressor 322 of the wireless terminal 300 decrypts and decompresses the received electronic data package, at step 412, and extracts the decompressed formatted electronic data from the data package. Then, if the decompressed electronic data includes format tags, the data reformatter 324 reformats the formatted electronic data using the format tags in the electronic data. If the formatted electronic data includes standard word abbreviations, the data reformatter 324 replaces the word abbreviations with their associated words. Further, if the formatted data also includes pre-defined binary phrase tags, at step 414 the data reformatter 324 queries the dictionary database 318 with the pre-defined binary phrase tags in order to replace the phrase tags included in the electronic data with their associated words or phrases. The data processing system 306 then displays the decompressed electronic data on the display device 310, at step 416.

If upon review of the electronic data, the operator concludes that the electronic data was insufficiently or excessively filtered by the electronic data transmission system 200, the operator can request a different level of data filtration at step 414 by transmitting a desired filtration parameter to the electronic data transmission system 200 and repeating steps 406 to 416 above.

As will be apparent from the foregoing discussion, since the electronic data transmission system 200 reduces the size of the electronic data prior to transmission to the network terminal 300 (via data formatting and/or compression), the network bandwidth required to transmit the data package is less than that of the prior art transmission systems. Further, since the operator of a network terminal 300 can recursively specify alternate data filtration parameters for the desired electronic data, the operator can tailor the level of filtration in accordance with the data resolution capabilities of the network terminal 300 and the contents/characteristics of the electronic data.

Figure 5:
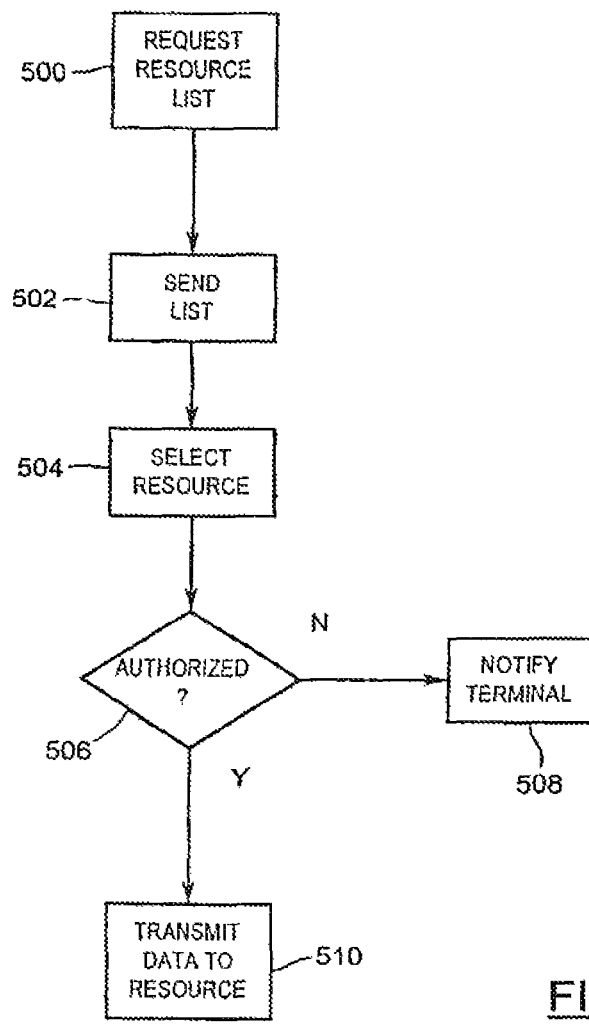
FIG. 5 is a flow chart depicting the method of transmitting the electronic data between one of the network terminals and a network resource via the electronic data transmission system.

Thus far in the discussion, the process performed by the electronic data communication system 100 has focused on its ability to transmit filtered/compressed electronic data to network terminals 300. However, the electronic data communication system 100 can also be used to transmit electronic data to network resources 104 upon command from the network terminals 300. This aspect of the invention will be described with reference to FIG. 5.

As shown therein, at step 500 the operator of the network terminal 300 selects a network resource 104 by transmitting to the electronic data transmission system 200 a request over the wireless network 112 for a list of available network resources 104.

The network resource query may be based upon any desired criteria, including print turn-around time and page size (where the target network resource 104 is a printer), price, and geography. In addition, the operator may provide the electronic data transmission system 200 with the geographical coordinates of the wireless terminal 300 to determine the operator's nearest network resources. The operator may provide its geographical coordinates through any suitable mechanism known to those skilled in the art, including latitude/longitude co-ordinates, GPS, and wireless triangulation.

At step 502, the authorization processor 222 of the electronic data transmission system 200 transmits to the wireless terminal 300 a list of pseudo-names associated with each network resource 104 which satisfies the designated search criteria. If the operator logged in to the electronic data communication system 100, the authorization processor 222 generates the required list by querying the resource database 114 with the operator's username to identify the network resources 104 with which the operator has been authorized to communicate. Accordingly, in this scenario the pseudo-name list will include both "public access" network resources 104 and "authorized access" network resources 104 with which the operator has been authorized to communicate.

Also, if the user is member of an enterprise having network resources 104 registered with the electronic data communication system 100, the pseudo-name list will also identify network resources 104 which have been registered by the enterprise for "private access". Otherwise, the pseudo-name list will only identify network resources 104 registered for public access.

Upon receipt of the resource list, the operator selects a network resource 104 from the list. Then, at step 504, the operator of the network terminal 300 transmits a transmission request to the electronic data transmission system 200, specifying the pseudo-name of the selected network resource 104. The authorization processor 222 of the electronic data transmission system 200 queries the resource database 114 with the received pseudo-name for the resource record associated with the pseudo-name.

The authorization processor 222 then extracts the user access level from the user access level field of the retrieved resource record, at step 506, and verifies that the network terminal 300 is still authorized to communicate with the selected network resource 104. As will be apparent from the foregoing discussion, if the user access level field specifies "public access" for the network resource 104, the network terminal 300 will be automatically authorized to communicate with the network resource 104.

However, if the user access level field specifies "private access" for the network resource 104, the authorization processor 222 determines the network address of the network terminal 300 from the transmission request transmitted by the network terminal 300, and then queries the user access level sub-field with the terminal's network address to determine whether the network terminal 300 is still authorized to communicate with the network resource 104. On the other hand, if the user access level field specifies "authorized access" for the network resource 104, the authorization processor 222 queries the user access level sub-field with the operator's username to determine whether the network terminal 300 is still authorized to communicate with the network resource 104.

If the query at step 506 reveals that the network terminal 300 is no longer authorized to communicate with the network resource 104, at step 508 the authorization processor 222 provides the network terminal 300 with a notification that the network terminal 300 is not authorized for communication with the selected resource 104. However, if the query at step 506 reveals that the network terminal 300 is still authorized to communicate with the network resource 104, the authorization processor 222 queries the network address field of the resource record associated with the network resource 104 for the network address of the network resource 104. The authorization processor 222 then transmits the original unfiltered uncompressed electronic data to the network resource 104 at the specified network address, at step 510.

Typically, the network resource 104 will comprise a land-based network resource, accordingly the authorization processor 222 will transmit the unfiltered uncompressed electronic data to the network resource 104 over the land-based communications network 108. As will be apparent, this mechanism of transmitting electronic data to land-based network resources 104 is advantageous since it allows the original electronic data to be transmitted to the network resource 104 without requiring significant wireless network bandwidth. However, the network resource 104 may also comprise a wireless-based network resource. Although transmission of the original unfiltered uncompressed electronic data to the network resource 104 would increase the wireless bandwidth requirements of the electronic data communication system 100, the transmission of the electronic data to the network resource 104 would not be hindered by the processing power limitations of the network terminal 300.

The foregoing description is intended to be illustrative of the preferred embodiment of the present invention. Those of ordinary skill may envisage certain additions, deletions and/or modifications to the described embodiment which, although not explicitly described herein, are encompassed by the spirit or scope of the invention, as defined by the claims appended hereto.

We claim:

1. A method of recursively reformatting electronic data for a network terminal comprising the steps of:
   receiving a first request, at a server from the network terminal for transmission of electronic data over a communications network to the network terminal, the first request specifying a first data resolution level of a display of the network terminal by a data filtration parameter included in the first request, the first data resolution level being different from a stored data resolution capability of the display as accessible by the server;
   selecting by the server the first data resolution level instead of the stored data resolution capability;
   reformatting the electronic data into a less memory-intensive data format in response to the first request by reducing the resolution of the electronic data in accordance with the first data resolution level to provide a first formatted electronic data;
   transmitting the first formatted electronic data to the network terminal over the communications network;
   receiving a second request by the server from the network terminal requesting retransmission of the electronic data over the communications network to the network terminal, the second request being a recursive specification of an alternate data resolution level by an alternate data filtration parameter included in the second request, the alternate data resolution level being different from the first data resolution level;
   reformatting by the server the electronic data in accordance with the alternate data resolution level to provide a second reformatted data in response to the second request; and
   transmitting the second reformatted data to the network terminal over the communications network.

2. The method according to claim 1, wherein the first data resolution level specifies an image resolution and the first reformatted data is an image converted to the first data resolution level.

3. The method according to claim 1, wherein the first data resolution level specifies text and the first reformatted electronic data is text from the electronic data.

4. The method according to claim 1, wherein the electronic data is an e-mail message.

5. The method according to claim 1, further comprising transmitting a list of items over a communications network to a network terminal, the list containing a plurality of data identifiers, at least one of the data identifiers associated with the electronic data.

6. An electronic data transmission server for transmitting recursively reformatted electronic data comprising:
   a storage device for storing data resolution capabilities of the display of a network terminal;
   a data receiver for receiving a first request from the network terminal for transmission of electronic data over a communications network to the network terminal, the first request specifying a first data resolution level of a display of the network terminal by a data filtration parameter included in the first request, the first data resolution level being different from the stored data resolution capability of the display by the server, and for receiving a second request from the network terminal requesting retransmission of electronic data over a communications network to the network terminal, the second request being a recursive specification of an alternate data resolution level by an alternate data filtration parameter included in the second request, the alternate data resolution level being different from the first data resolution level;
   a data processing system in communication with the data receiver, the data processing system for reformatting the electronic data into a less memory-intensive data format in response to the first request by reducing resolution of the electronic data in accordance with the first data resolution level to provide a first formatted electronic data, and for reformatting the electronic data according to the alternate data resolution level to provide a second formatted electronic data in response to the second request; and
   a data transmitter in communication with the data processing system, the data transmitter for transmitting the first formatted electronic data to the network terminal over the communications network, and for transmitting the second formatted electronic data to the network terminal over the communications network.

7. The electronic data transmission server according to claim 6, wherein the first data resolution level specifies an image resolution and the first reformatted data is an image converted to the first data resolution level.

8. The electronic data transmission server according to claim 6, wherein the first data resolution level specifies text and the first reformatted electronic data is text from the electronic data.

9. The electronic data transmission server according to claim 6, wherein the electronic data is an e-mail message.

10. The electronic data transmission server according to claim 6, wherein the data transmitter further transmits a list of items over a communications network to the network terminal, the list containing a plurality of data identifiers, at least one of the data identifiers associated with the electronic data.

11. A network terminal for receiving recursively requested reformatted electronic data from a data transmission server, the network terminal comprising:
- a wireless network interface for communicating with the data transmission server by requesting transmission of electronic data, receiving first formatted electronic data formatted to reduce resolution of the electronic data in accordance with a first data resolution level in response to the request for transmission, requesting, retransmission of the electronic data according to an alternate data resolution level instead of the data resolution capabilities of the display of the network terminal, and receive second formatted electronic data formatted in accordance with the alternate data resolution level in response to the request for retransmission;
- a user interface having a display and a data entry device; and
- a data processing system having a processor and memory coupled to the wireless network interface and the user interface, the processor configured to process the received first formatted electronic data to display on the user interface, provide the request for retransmission as a recursive specification of the alternate data resolution level according to input received from the data entry device, and display the second formatted data on the user interface.

12. The network terminal according to claim 11, wherein the first data resolution level specifies an image resolution and the first reformatted data is an image converted to the first data resolution level.

13. The network terminal according to claim 11, wherein the first data resolution level specifies text and the first reformatted electronic data is text from the electronic data.

14. The network terminal according to claim 11, wherein the electronic data is an e-mail message.

15. The network terminal according to claim 11, wherein the wireless network interface is configured to receive a list containing a plurality of data identifiers, at least one of the data identifiers associated with, and wherein the processor is further configured to receive an indication of the data identifier associated with the electronic data from the list from the data entry device.

* * * * *